United States Patent
Park et al.

(10) Patent No.: US 8,368,855 B2
(45) Date of Patent: Feb. 5, 2013

(54) METHOD OF MANUFACTURING A LIQUID CRYSTAL DISPLAY DEVICE COMPRISING AN ORGANIC FILM AND A REFLECTION ELECTRODE HAVING AN EMBOSSED PATTERN

(75) Inventors: Ku Hyun Park, Uiwang-si (KR); Jong Hwae Lee, Seoul (KR)

(73) Assignee: LG Display Co. Ltd., Seoul (KR)

( * ) Notice: Subject to any disclaimer, the term of this patent is extended or adjusted under 35 U.S.C. 154(b) by 919 days.

(21) Appl. No.: 12/247,758

(22) Filed: Oct. 8, 2008

(65) Prior Publication Data
US 2009/0091675 A1   Apr. 9, 2009

(30) Foreign Application Priority Data
Oct. 9, 2007  (KR) .................. 10-2007-0101714

(51) Int. Cl.
*G02F 1/1335* (2006.01)
*G02F 1/1343* (2006.01)
*G02F 1/13* (2006.01)

(52) U.S. Cl. .................. 349/114; 349/141; 349/187

(58) Field of Classification Search .................. 349/114, 349/141, 138, 187; 438/30
See application file for complete search history.

(56) References Cited

U.S. PATENT DOCUMENTS

| | | | |
|---|---|---|---|
| 6,975,376 B2* | 12/2005 | Kim | 349/114 |
| 2005/0094067 A1* | 5/2005 | Sakamoto et al. | 349/114 |
| 2006/0050209 A1* | 3/2006 | Higa | 349/114 |
| 2006/0125986 A1* | 6/2006 | Choo et al. | 349/114 |

* cited by examiner

*Primary Examiner* — Mark Robinson
*Assistant Examiner* — Paul Lee
(74) *Attorney, Agent, or Firm* — Brinks Hofer Gilson & Lione

(57) ABSTRACT

An LCD device adapted to implement a higher aperture ratio and to reduce its power consumption is disclosed. The LCD device includes: gate lines and data lines crossing each other to define pixel regions; a thin film transistor formed in each intersecting region of the gate lines and the data lines; a reflection electrode of plane shape, electrically connected to a drain electrode of the thin film transistor; a pixel electrode disposed in each of the pixel regions; and a common electrode having a slit structure, over the pixel electrode and the reflection electrode.

6 Claims, 10 Drawing Sheets

METHOD OF MANUFACTURING A LIQUID CRYSTAL DISPLAY DEVICE COMPRISING AN ORGANIC FILM AND A REFLECTION ELECTRODE HAVING AN EMBOSSED PATTERN

CROSS-REFERENCE TO RELATED APPLICATION

This application claims priority under 35 U.S.C. 119 to Korean Patent Application No. 10-2007-0101714, filed on Oct. 9, 2007, which is hereby incorporated by reference in its entirety.

BACKGROUND

1. Field of the Disclosure

This disclosure relates to a liquid crystal display device, and particularly to a liquid crystal display device adapted to realize (or implement) a higher aperture ratio and to be driven at a lower voltage, and a manufacturing method thereof.

2. Description of the Related art

It is the trend that liquid crystal display (LCD) devices are being used in a wider range of application fields because of their features, such as their light weight, slimness, a low driving voltage, and so on. This trend is evidently confirmed in the ways in which the LCD devices have been applied to office automation equipment, audio equipment, video equipment, and so on.

The LCD devices adopt a light transmittance characteristic of liquid crystal varying along an applied voltage and convert electric signals into visual information, thereby displaying an image (or a picture). The liquid crystal should be of a material which is in a medium state between the liquid and the crystal. To this end, the LCD devices each include two substrates having electrodes and a liquid crystal layer interposed between the substrates. Such LCD devices are lighter and thinner and are driven at a lower voltage in comparison with other display devices that have the same screen size.

Typical LCD devices, the devices of thin film transistor type, have a problem in a narrow viewing angle. To solve this problem, LCD devices of multi-domain structure, optically compensated birefringence (OCB) mode, in-plane switching (IPS) mode, and so on, have been proposed. The LCD device of multi-domain structure is complicated in processes of forming multi domains and is limited in the improvement of viewing angle. Also, the LCD device of OCB mode has electro-optical performances which are superior in the characteristics of viewing angle and response speed, but has a disadvantage in that it is difficult to stably control and maintain the liquid crystal by means of a bias voltage. Furthermore, the IPS mode LCD device has advantages in that a large screen and a large viewing angle can be implemented, but has a disadvantage in that its aperture ratio is low.

Since the LCD devices of related art have disadvantages in the narrow viewing angle and/or lower aperture ratio, it becomes necessary to address these matters. Moreover, as the display device becomes gradually larger in size, it is also necessary to find a way to prevent the power consumption from increasing along with the size of LCD device.

BRIEF SUMMARY

An LCD device includes: gate lines and data lines crossing each other to define pixel regions; a thin film transistor formed in each intersecting region of the gate lines and the data lines; a reflection electrode of plane shape, electrically connected to a drain electrode of the thin film transistor; a pixel electrode disposed in each of the pixel regions; and a common electrode having a slit structure, over the pixel electrode and the reflection electrode.

A manufacturing method of an LCD device according to another aspect of the present embodiment includes: forming a gate line extended in a direction on a substrate and a gate electrode; forming a gate insulation film on the entire surface of the substrate including the gate electrode; forming an active layer, an ohmic contact layer, and source/drain electrodes on the gate insulation film in opposition to the gate electrode; forming a passivation layer on the entire surface of the substrate including the source/drain electrodes; forming an organic film on the passivation layer, to have an embossed pattern and a contact hole at a region corresponding to the drain electrode; forming a reflection electrode of plane shape on the contact hole and embossed pattern of the organic film; forming a pixel electrode of plane shape to be electrically connected to the reflection electrode; and forming a common electrode having a slit structure opposite to and over the reflection and pixel electrodes.

A manufacturing method of an LCD device according to still another aspect of the present embodiment includes: forming a gate line extended in a direction on a substrate and a gate electrode; forming a gate insulation film on the entire surface of the substrate including the gate electrode; forming an active layer and an ohmic contact layer on the gate insulation film in opposition to the gate electrode; forming a pixel electrode on the gate insulation film within a pixel region; forming source/drain electrodes on the active and ohmic contact layers; forming a passivation layer on the entire surface of the substrate including the source/drain electrodes and the pixel electrode; forming an organic film which has an embossed pattern and a contact hole exposing the drain electrode; forming a reflection electrode of plane shape on the contact hole and embossed pattern of the organic film; and forming a common electrode having a slit structure opposite to and over the reflection and pixel electrodes.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
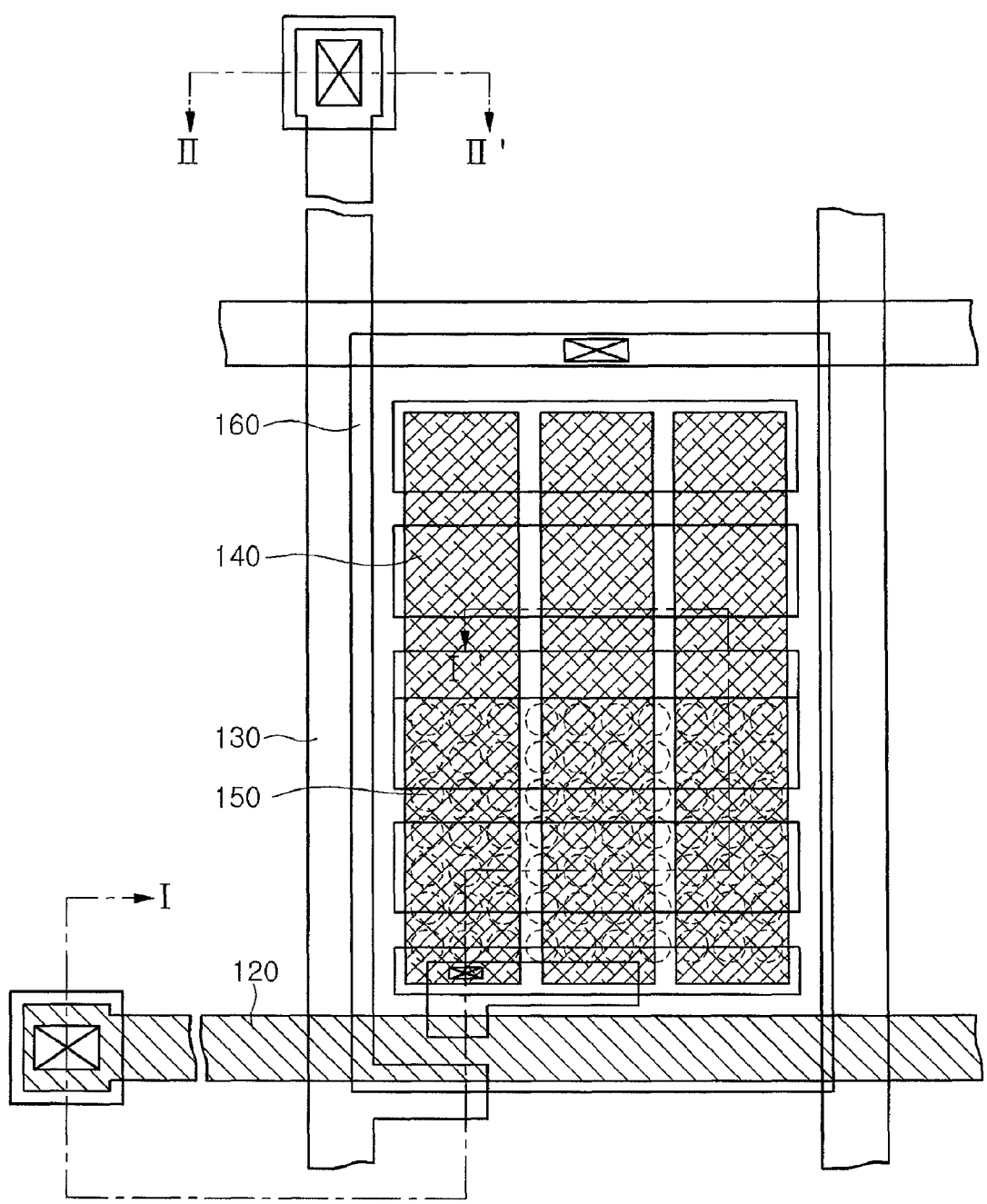
FIG. 1 is a plane view showing a thin film transistor substrate of an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
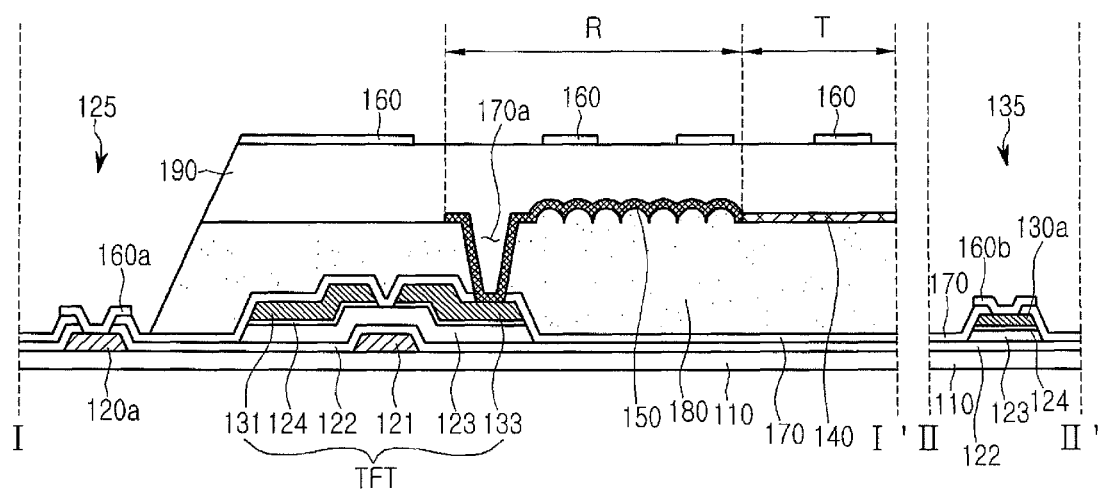
FIG. 2 is a cross sectional view showing the thin film transistor substrate taken along lines I-I' and II-II' in FIG. 1.

FIG. 1 is a plane view showing a thin film transistor substrate of an LCD device according to an embodiment of the present disclosure. FIG. 2 is a cross sectional view showing a thin film transistor substrate taken along lines I-I' and II-II' in FIG. 1. As shown in FIGS. 1 and 2, a thin film transistor substrate of an LCD device according to an embodiment of the present disclosure includes gate lines 120 and data lines 130 which are disposed on the bared substrate 110 and cross each other in the center of a gate insulation film 122 interposed therebetween. Herein, FIG. 1 is a view showing only one of pixels on the thin film transistor substrate. The thin film transistor substrate also includes a thin film transistor TFT which is formed at each intersection region of the gate and data lines 120 and 130. The thin film transistor substrate further includes a passivation film (or a protection film) 170, an organic film 180, a pixel electrode 140, and a common electrode 160.

The thin film transistor TFT is disposed to partially overlap with a reflection region R of the mother substrate 110. This thin film transistor TFT includes a gate electrode 121, the gate insulation film 122, an active pattern 123, an ohmic contact pattern 124, a source electrode 131, and a drain electrode 133. More specifically, the gate insulation film 122 covers the gate electrode 121 so as to electrically insulate the gate electrode 121 from an upper layer which is described below. The active pattern 123 and the ohmic contact pattern 124 are disposed on the gate insulation film 122. The source electrode 131 is branched from the data line 130 which receives a data drive signal. The drain electrode 133 is disposed to be separated from the source electrode 131.

The passivation film 170 is formed on the entire surface of the mother substrate 110 to cover the thin film transistor TFT. Herein, the drain electrode 133 is exposed to the exterior of the passivation film 170 in the reflection region R through a contact hole 170a.

The organic film 180 is formed on the passivation film 170 except the areas corresponding to a gate pad portion 125 and a data pad portion 135. This organic film 180 includes the contact hole 170a provided over the drain electrode 133. The contact hole 170a exposes a part of the drain electrode 133 to the exterior of the organic film 180.

On the upper surface of the organic film 180, an embossed pattern is formed. The embossed pattern is positioned in opposition to the reflection region R which is expanded from the contact hole 170a.

A reflection electrode 150, having an embossed surface and reflecting lights, is disposed on a part of the organic film 180 which is opposed to the reflection region R. More specifically, the reflection electrode 150 is disposed on the contact hole 170a and embossed pattern of the organic film 180. In accordance therewith, the reflection electrode 150 is electrically connected to the drain electrode 133 which is exposed through the contact hole 170a.

On another part of the organic film 180 which is opposed to a transmission region T, the pixel electrode 140 formed of a transparent material is disposed. The pixel electrode 140 is formed in a plane shape and is electrically connected to the reflection electrode 150.

A planarization layer 190 is disposed on the organic film 180 so as to cover the reflection electrode 150 and the pixel electrode 140.

On the planarization layer 190, the common electrode 160 formed of a conductive transparence material is disposed. The common electrode 160 faces the reflection electrode 150 and the pixel electrode 140 and has a structure in which a plurality of slits are formed. Also, the common electrode 160 is overlapped with the gate line 120 and the data line 130 by a fixed region.

Such an LCD device according to the embodiment of the present disclosure drives a liquid crystal layer (not shown) by means of an electric field which is generated between the common electrode 160 and the reflection electrode 150 connected to the drain electrode 133. This electric field allows even liquid crystal molecules directly on the common electrode 160 can be normally driven, because a distance between the reflection electrode 150 and the common electrode 160 is greatly shortened. Moreover, the LCD device according to the embodiment of the present disclosure drives a liquid crystal layer by means of another electric field which is generated between the common electrode 160 and the pixel electrode 140 within the transmission region T. The another electric field also allows even the liquid crystal molecules directly on the common electrode 160 can be normally driven, because a distance between the pixel electrode 140 and the common electrode 160 is greatly shortened.

In this manner, the LCD device according to the embodiment of present disclosure disposes the slit structured common electrode 160 on the reflection electrode 150 of the embossed plane shape, which is electrically connected to the drain electrode 133, and the pixel electrode 140 electrically connected to the reflection electrode 150. Accordingly, the LCD device normally drives even the liquid crystal molecules directly on the common electrode 160 through a fringe field effect. As a result, the LCD device can expand more of the transmission region in comparison with the one of the related art.

Also, the common electrode 160 at the most upper layer is partially overlapped with the gate line 120 and the data line 130, thereby normally driving even the liquid crystal molecules around the non-display region. Therefore, the LCD device according to the embodiment of the present disclosure improves the deteriorations of brightness and aperture ratio in the non-display region. In other words, the LCD device can implement the higher aperture ratio and also can improve the brightness.

Furthermore, the LCD device according to the embodiment of the present disclosure structurally includes the reflection region and the transmission region so that it can use an external light. As a result, the LCD device not only can reduce more of the consumption power than the related art, but also can implement the higher aperture ratio.

FIGS. 3A to 3H are cross sectional views explaining a manufacturing method of a thin film transistor substrate of an LCD device according to an embodiment of the present disclosure.

Figure 3A:
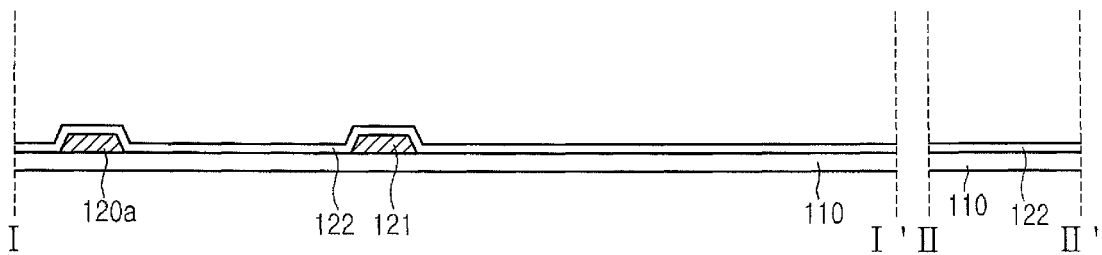
FIGS. 3A to 3H are cross sectional views explaining a method manufacturing a thin film transistor substrate of an LCD device, according to an embodiment of present disclosure.

As shown in FIG. 3A, a gate electrode 121 and a gate pad electrode 120a are arranged on a bared substrate 110. The gate electrode 121 and the gate pad electrode 120a are formed through the process of forming a conduction material film through a deposition method such as spattering, forming a photo resist pattern by using a mask, and etching the conduction material film. The gate electrode 121 and the gate pad electrode 120a may include any one of Al, AlNd, W, Cu, Mo, Cr, and MoW. On the substrate 110 including the gate electrode 121 and the gate pad electrode 120a, a gate insulation film is deposited. The gate insulation film 122 may include any one of silicon nitride $SiN_x$ film, silicon oxide $SiO_2$ film, and a stack film thereof, which are formed through either a spattering process or a chemical vapour deposition process.

Figure 3B:
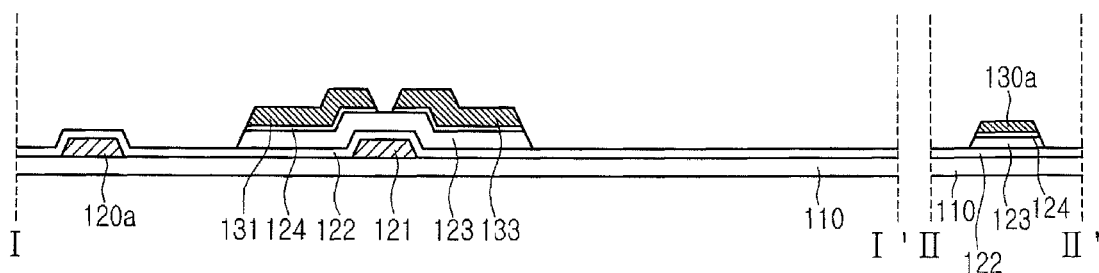
Figure 3C:
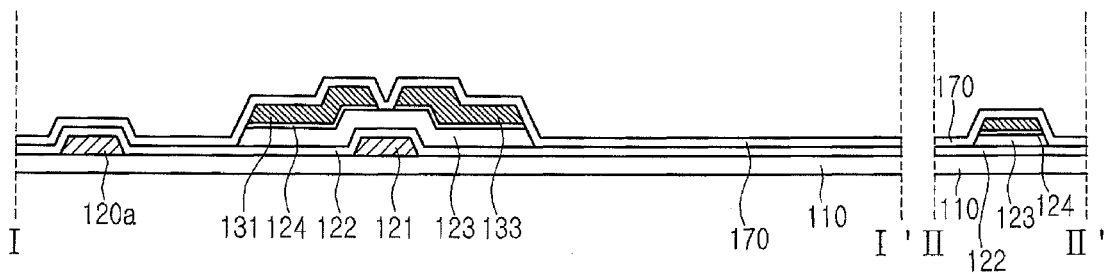

Referring to FIG. 3B, an amorphous silicon layer, an amorphous dopant silicon layer, and a conduction layer are sequentially stacked on the gate insulation film 122, and are patterned through a photo resist pattern formation process using a mask and an etching process. In accordance therewith, an active pattern 123, an ohmic contact pattern 124, and source/drain electrodes 131 and 133 are formed in a region opposite the gate electrode 121, in such a manner to be stacked. Moreover, on a data pad portion 125, another active pattern 123, another ohmic contact pattern 124, and data pad electrode 130a are formed in a sequentially stacked structure.

Figure 3D:
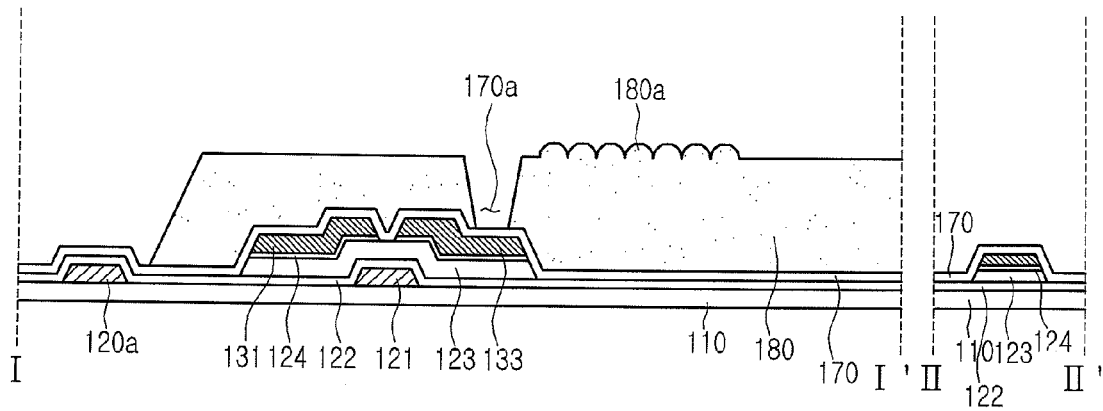
Figure 3E:
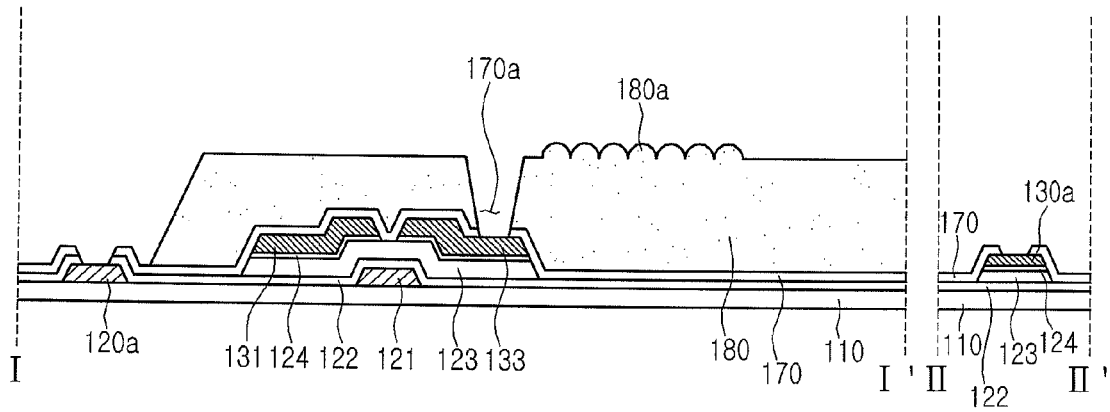

On the entire surface of the substrate 110, including the thin film transistor, a passivation film (or a protection film) 170 is formed, as shown in FIG. 3E.

In a state that a contact hole is not formed, an organic film 180 having a contact hole 170a is formed on the passivation film 170 through the process of coating an organic group material, forming a photo resist pattern by using a mask, and etching the coated organic material, as shown in FIG. 3D. The organic film 180 includes an embossed pattern 180a. The embossed pattern 180a is expanded from the contact hole 170a. In detail, the embossed pattern 180a is disposed in a region corresponding to the reflection region R in FIG. 2.

Referring to FIG. 3E, a part of the passivation film 170 corresponding to the contact hole 170a is removed through the process of forming a photo resist pattern by using a mask and then partially etching the passivation film 170. Hereby, the contact hole 170a exposes the drain electrode 133 to the exterior of the organic film 180. Moreover, the gate pad electrode 120a is exposed between the stacked layer of the gate insulation film 122 and passivation film 170, the data pad electrode 130a is exposed between the passivation film 170.

Figure 3F:
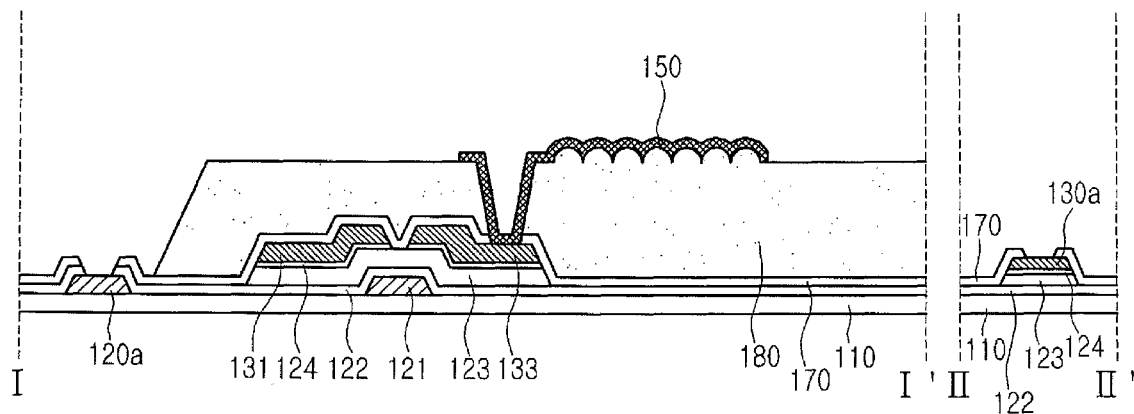

On the contact hole 170a and the embossed pattern 180a, a reflection electrode 150 reflecting lights is formed through the process of depositing a metal material on the organic film 180, forming a photo resist pattern by using a mask, and etching the deposited metal material, as shown in FIG. 3F. The reflection electrode 150 may be formed from one of Al, Ag, and AlNd. This reflection electrode 150 disposed in the contact hole 170a and the embossed pattern 180a is electrically connected to the drain electrode 133.

Figure 3G:
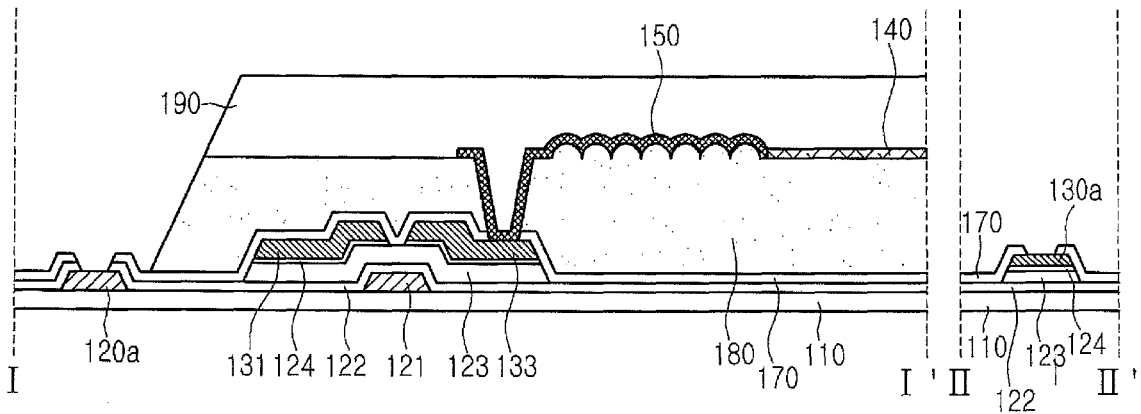

A pixel electrode 140 is provided on a part of the organic film 180, as shown in FIG. 3G. The pixel electrode 140 can be formed through the process of depositing an metal on the entire surface of the organic film 180, including the reflection electrode 150, forming a photo resist pattern by using a mask, and etching the metal. The metal may be selected from a transparent conduction metal group including indium-tin-oxide ITO and indium-zinc-oxide IZO. This pixel electrode 140 is electrically connected to the reflection electrode 150, since its side portion is in contact with a side portion of the reflection electrode 150. On the entire surface of the organic film 180, including the pixel and reflection electrodes 140 and 150, a planarization layer 190 is formed by coating an organic group material.

Figure 3H:
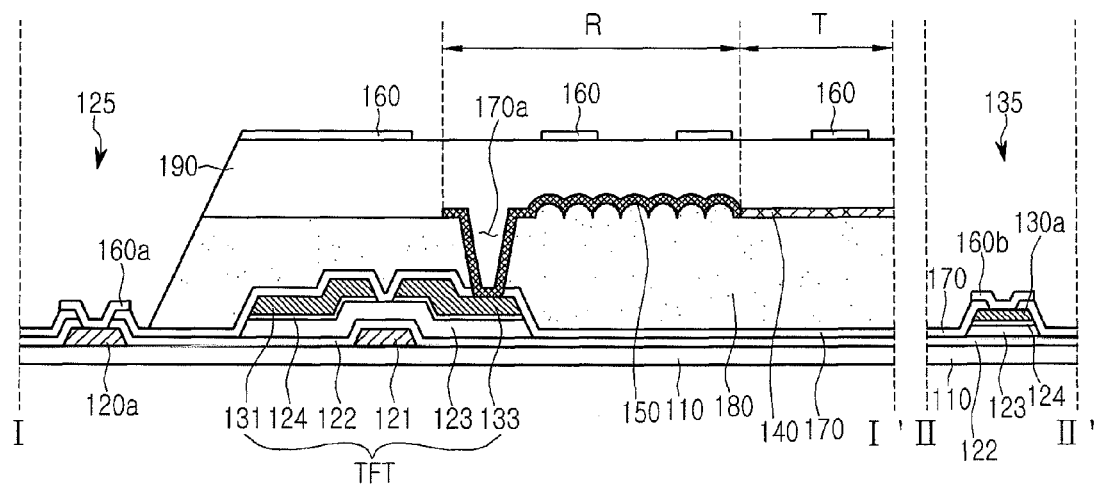

Referring to FIG. 3H, a common electrode 160, a gate pad contact electrode 160a, and a data pad contact electrode 160b are formed on the respective planarization layer 190, gate pad portion 125, and data pad portion 135, through the photolithography processes. The photolithography processes include depositing a metal on the planarization layer 190 and the gate and data pad portions 125 and 135, forming a photo resist pattern by using a mask, and etching the metal. The metal may be selected from a transparent conduction metal group including indium-tin-oxide ITO and indium-zinc-oxide IZO.

FIGS. 4A to 4J are cross sectional views explaining a manufacturing method of a thin film transistor substrate of an LCD device according to another embodiment of the present disclosure.

Figure 4A:
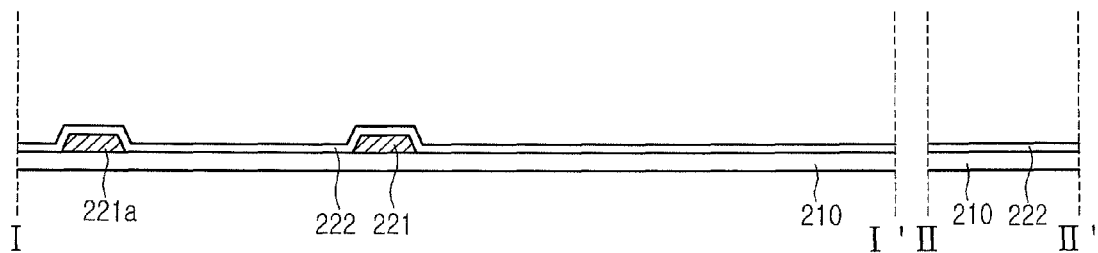
FIGS. 4A to 4J are cross sectional views explaining a method manufacturing a thin film transistor substrate of an LCD device, according to another embodiment of the present disclosure.

Referring to FIG. 4A, a gate electrode 221 and a gate pad electrode 221a are formed on a bared substrate 210 through a depositing process of conduction material, a forming process of photo resist pattern, and an etching process. On the entire surface of the bared substrate 210 loaded with the gate electrode 221 and the gate pad electrode 221a, a gate insulation film 222 is deposited.

Figure 4B:
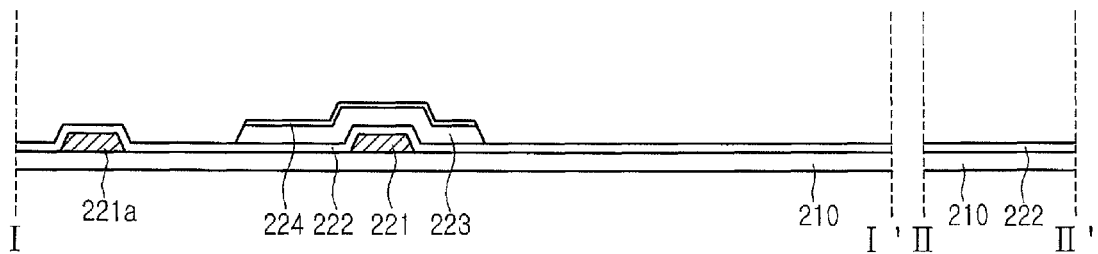

An active pattern 223 and an ohmic contact pattern 224 are formed on the gate insulation film 222 by sequentially stacking an amorphous silicon layer and an amorphous dopant silicon layer and by patterning those, as shown in FIG. 4B.

Figure 4C:
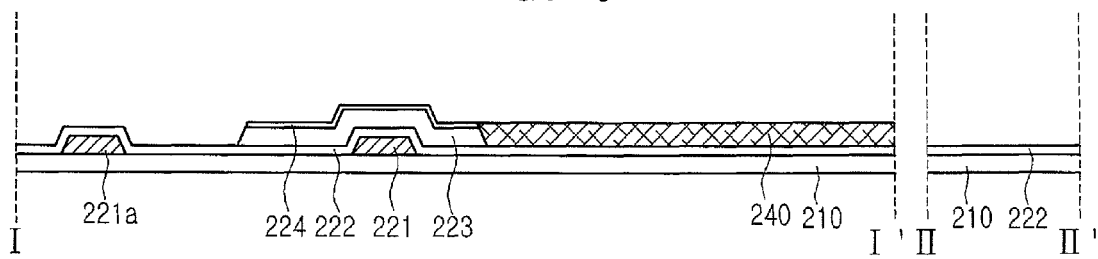

As shown in FIG. 4C, a pixel electrode 240 is disposed on the gate insulation film 222. The pixel electrode is formed through process of depositing one of transparent conduction material group on the entire surface of the bared substrate 210 which includes the active and ohmic contact patterns 223 and 224, forming a photo resist pattern by a use of mask, and etching the transparent conduction group material. The transparent conduction material group includes indium-tin-oxide ITO and indium-zinc-oxide IZO.

Figure 4D:
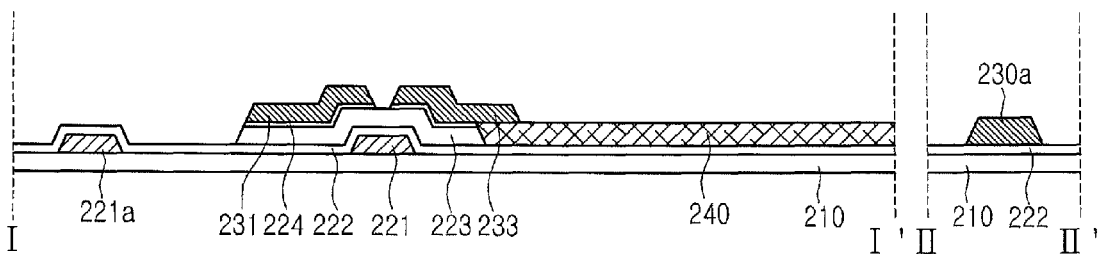

Referring to FIG. 4D, a conduction film is formed on the entire surface of the bared substrate 210 inclusive the active and ohmic contact patterns 223 and 224 and the pixel electrode 240 and is patterned, thereby forming source/drain electrodes 231 and 233 and a data pad electrode 230a. The drain electrode 233 is partially overlapped with the pixel electrode 240 and is electrically connected to the pixel electrode 233.

Figure 4E:
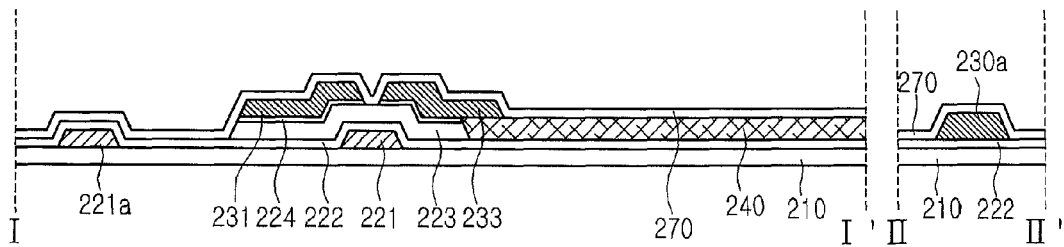

Sequentially, a passivation film (or a protection film) 270 is formed on the entire surface of the bared substrate 210 including a thin film transistor TFT and the data pad electrode 230a, as shown in FIG. 4E. Herein, the thin film transistor TFT includes the gate electrode 221, the active and ohmic contact pattern 223 and 224, and the source/drain electrodes 231 and 233.

Figure 4F:
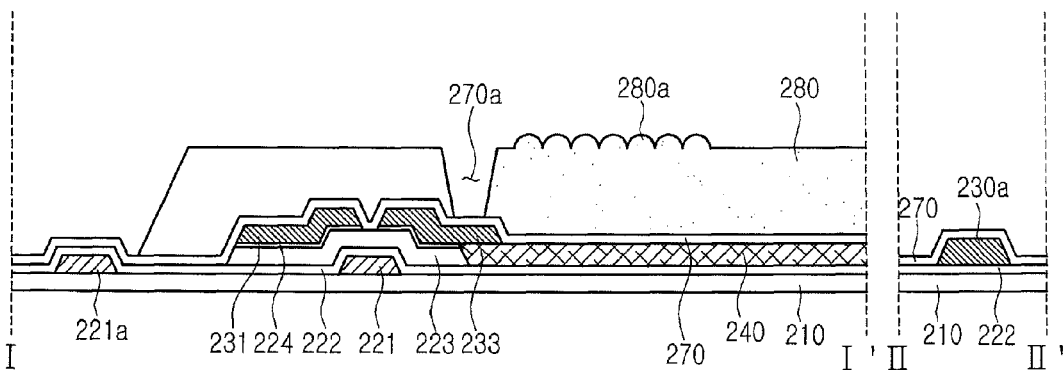

In a state that a contact hole is not formed, an organic film 280 including a contact hole 270a is formed on the passivation film 270, as shown in FIG. 4F. The contact hole 270a is positioned in a region opposite the drain electrode 233. The organic film 280 includes an embossed pattern 280a thereon.

Figure 4G:
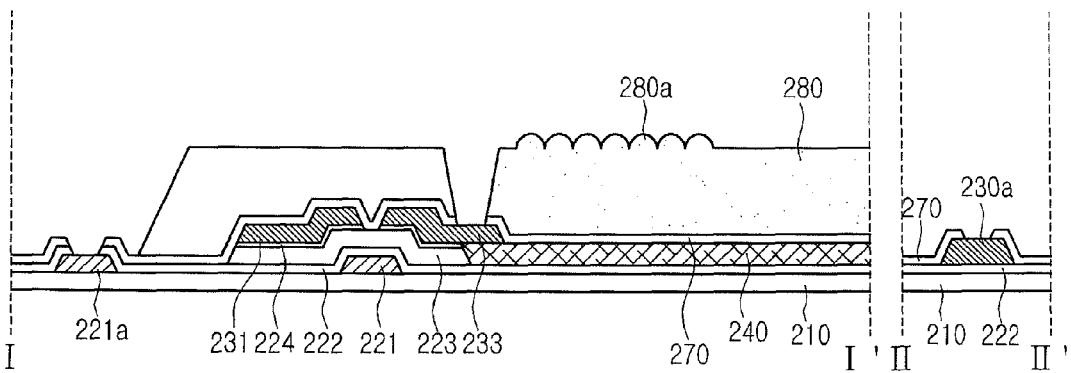
Figure 4H:
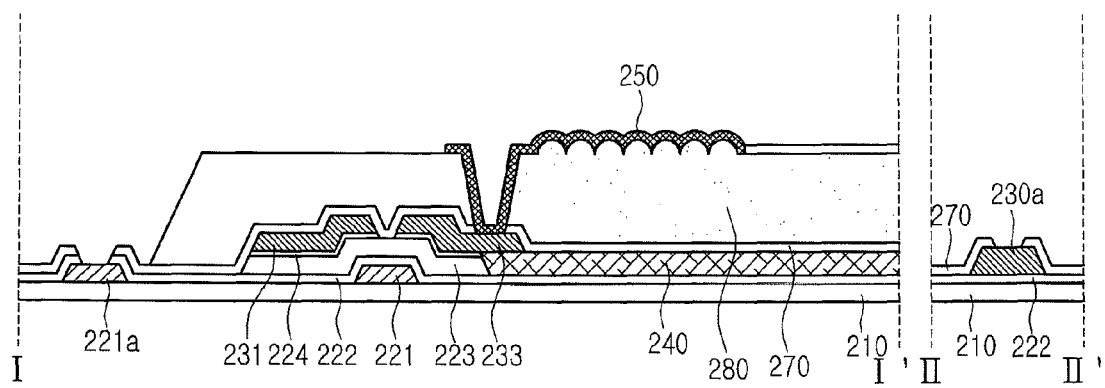

As shown in FIG. 4G, a part of the passivation film 270 opposite the contact hole 270a is removed through a photo resist pattern formation process using a mask and a etching process, thereby exposing the drain electrode 233. Moreover, the gate pad electrode 221a and the data pad electrode 230a also are exposed between the gate insulation film 222 and/or the passivation film 270.

On the contact hole 270a and embossed pattern 280a of the organic film 280, a reflection electrode 250 is formed. Herein, the reflection electrode 250 is electrically connected to the drain electrode 233. In accordance therewith, the reflection electrode 250, the drain electrode 233, and the pixel electrode 240 are electrically connected to one another.

Figure 4I:
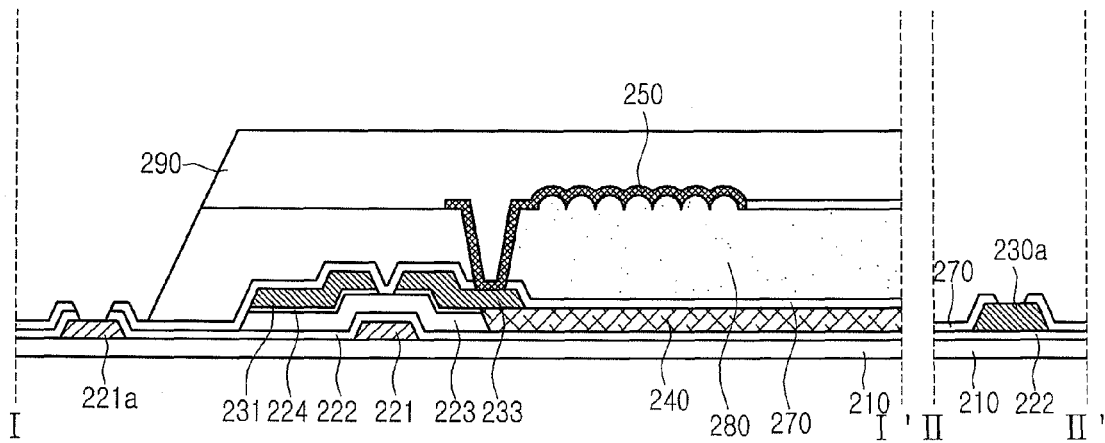
Figure 4J:
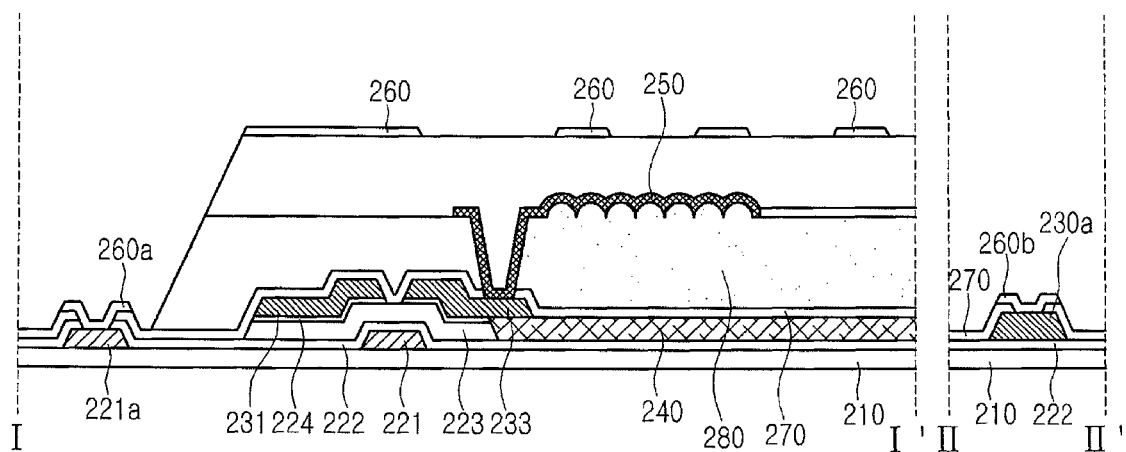

Referring to FIG. 4I, a planarization layer 290 is formed on the organic film 280 including the reflection electrode 250.

Finally, one of transparent conduction material group including indium-tin-oxide ITO and indium-zinc-oxide IZO is deposited on the planarization layer 290, the gate pad portion 225, and the data pad portion 235 and is patterned, thereby forming a common electrode 260, a gate pad contact electrode 260a, and a data pad contact electrode 260b.

In this way, the LCD device according to the embodiment of present disclosure disposes partially overlaps the pixel electrode 240 of plane shape with the drain electrode 233 in way of being in contact with them, connects the reflection electrode 250 of a plane shape to the drain electrode 233, and disposes the common electrode 260 of a slit shape at the uppermost portion. Accordingly, the LCD device of the present embodiment normally drives even the liquid crystal molecules directly on the common electrode 260 through a fringe field effect. As a result, the LCD device of the present embodiment can further improve the transmittance in comparison with the one of the related art.

Also, the common electrode 160 disposed at the uppermost portion is partially overlapped with the gate line 120 (not show) and the data line 130 (not shown), thereby normally driving even the liquid crystal molecules around the non-display region. Therefore, the LCD device according to the embodiment of the present disclosure prevents the deterioration of brightness and aperture ratio in the non-display region, i.e., the gate and data line regions. In other words, the LCD device can implement the higher aperture ratio and also can improve the brightness.

Moreover, the LCD device according to the embodiment of the present disclosure structurally includes the reflection region and the transmission region so that an external light can be used. As a result, the LCD device of the present embodiment not only can reduce more of the consumption power in comparison with the one of the related art, but also can implement the higher aperture ratio.

As described above, in the LCD devices according to the embodiments of the present disclosure, the slit structured common electrode is disposed on the reflection electrode of plane shape, which is electrically connected to the drain electrode, and the pixel electrode electrically connected to the reflection electrode. Accordingly, the LCD device normally drives even the liquid crystal molecules directly on the common electrode 160 through a fringe field effect. As a result, the LCD devices of the present embodiments can expand more of the transmission region in comparison with the one of the related art.

Moreover, the common electrode 160 at the most upper layer is partially overlapped with the gate line 120 and the data line 130 in structure, thereby normally driving even the liquid crystal molecules around the non-display region. Therefore, the LCD devices according to the embodiments of the present disclosure can prevent the deterioration of brightness and aperture ratio in the non-display region. In other words, the LCD devices of the present embodiments can implement the higher aperture ratio and further can improve the brightness.

Furthermore, the LCD devices according to the embodiments of the present disclosure structurally include the reflection region and the transmission region so as to use an external light. As a result, the LCD devices of the present embodiments not only can reduce more of the consumption power in comparison with the one of the related art, but also can implement the higher aperture ratio.

It will be apparent to those skilled in the art that various modifications and variations can be made in the present disclosure. Thus, it is intended that the present disclosure cover the modifications and variations of this embodiment provided they come within the scope of the appended claims and their equivalents.

What is claimed is:

1. A method of manufacturing a liquid crystal display device comprising:
    forming a gate line extended in a direction on a substrate and a gate electrode;
    forming a gate insulation film on the entire surface of the substrate including the gate electrode;
    forming an active layer, an ohmic contact layer, and source/drain electrodes on the gate insulation film in opposition to the gate electrode;
    forming a passivation layer on the entire surface of the substrate including the source/drain electrodes;
    forming an organic film on the passivation layer, to have an embossed pattern and a contact hole at a region corresponding to the drain electrode;
    forming a reflection electrode of plane shape on the contact hole and embossed pattern of the organic film;
    forming a pixel electrode of plane shape to be electrically connected to the reflection electrode;
    forming a planarization layer on the reflection and pixel electrodes; and
    forming a common electrode having a slit structure and being directly contacted on a surface of the planarization layer,
    wherein the common electrode is overlapped with the reflection and pixel electrodes.

2. The method claimed as claim 1, wherein the reflection electrode and the pixel electrode are arranged in the same layer.

3. The method claimed as claim 1, wherein the common electrode is partially overlapped with the gate and data lines.

4. The method claimed as claim 1, wherein the common electrode is overlapped with the gate and data lines.

5. The method claimed as claim 1, wherein the slit structure has a plurality of slits.

6. The method claimed as claim 5, wherein the plurality of slits are formed in parallel with the gate line.

* * * * *